United States Patent [19]
Witzel

[11] 3,711,676
[45] Jan. 16, 1973

[54] DIELECTRIC-FLOW-DIRECTING EDM ELECTRODE

[75] Inventor: John R. Witzel, Milford, Ohio

[73] Assignee: Cincinnati Milacron Inc., Cincinnati, Ohio

[22] Filed: Oct. 4, 1971

[21] Appl. No.: 185,963

[52] U.S. Cl. ............................. 219/69 D, 204/143 M
[51] Int. Cl. ........................... B23p 1/08, B23p 1/04
[58] Field of Search ............. 219/68, 69 D, 69 E, 69 M, 69 V, 219/69 R; 204/143 M

[56] References Cited

UNITED STATES PATENTS

| | | |
|---|---|---|
| 3,338,808 | 8/1967 | Johnson..........................219/69 V X |
| 3,067,358 | 12/1962 | De Maine......................219/69 D X |
| 3,390,247 | 6/1968 | Webb..................................219/69 D |
| 2,920,180 | 1/1960 | Ullmann et al.....................219/69 E |

Primary Examiner—R. F. Staubly
Attorney—Howard T. Keiser et al.

[57] ABSTRACT

An EDM electrode for directing dielectric flow to the gap, the electrode having a plug-shaped body with an axially displaceable machining end-face and including a high pressure biased circumferential cannelure in the body which is in fluidic communication with a fluid supply for introducing fluid to the gap and a sub-atmospheric pressure system for withdrawing the fluid from the gap.

9 Claims, 7 Drawing Figures

PATENTED JAN 16 1973   3,711,676
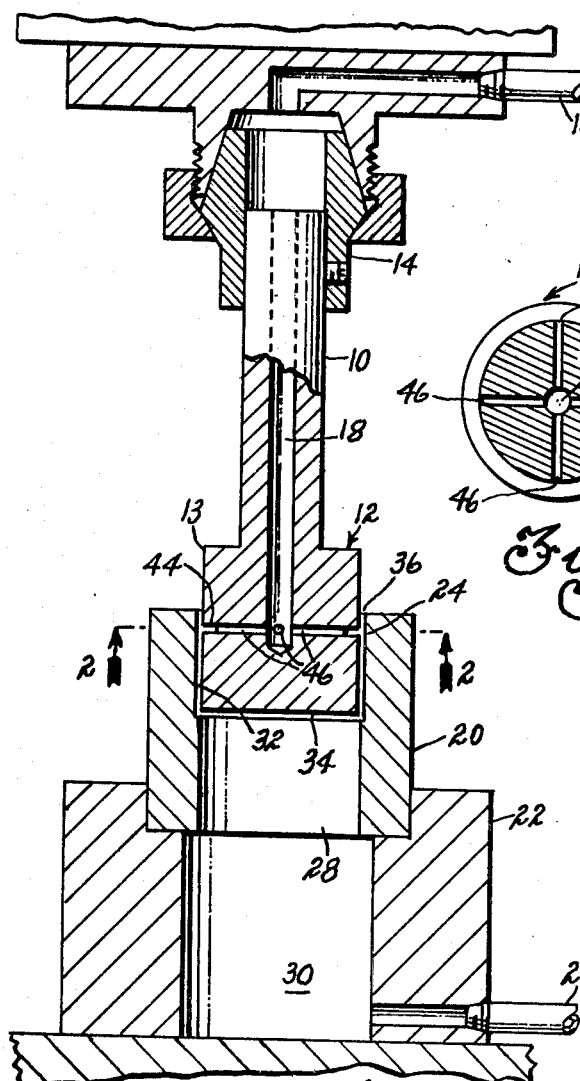
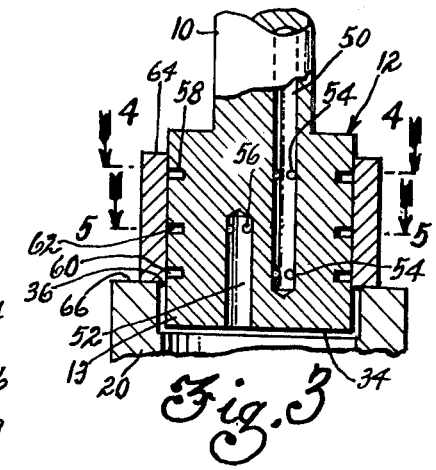
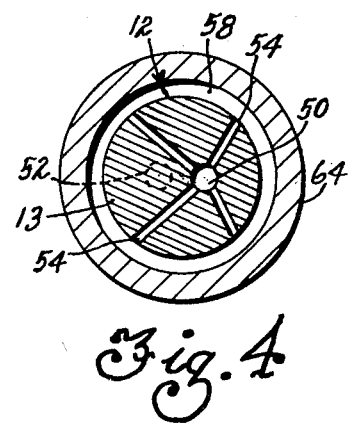
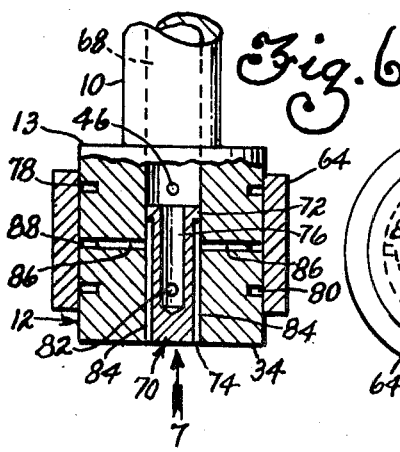
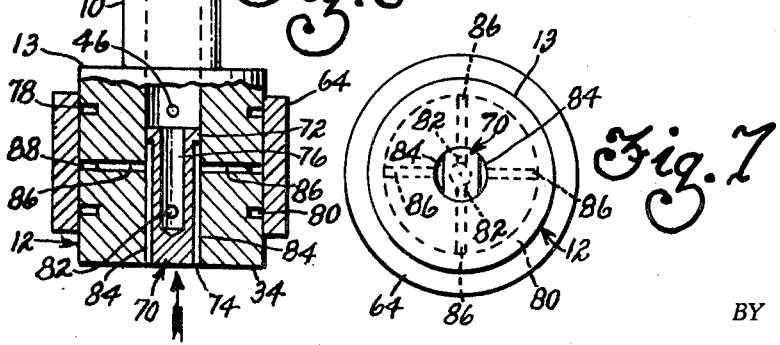
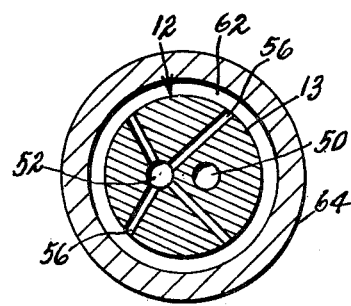
INVENTOR.
JOHN R. WITZEL
BY Howard T. Keiser
& Jack J. Earl
ATTORNEYS

DIELECTRIC-FLOW-DIRECTING EDM ELECTRODE

BACKGROUND OF THE INVENTION

This invention relates generally to electrical discharge machines (EDM) and specifically to tool electrodes therefor.

In EDM processing a dielectric fluid is used to provide a coolant and establish a dielectric medium between the tool electrode and the workpiece to facilitate sparking across the gap between the tool and work. This fluid further provides a means for flushing machined particles from the gap. Where the dielectric flow is restricted due to the proximity of the electrode to the workpiece the resistance to flow is necessarily increased. This resistance to flow limits the ability of the dielectric fluid to flush machined particles form the gap. As the machined particles accumulate in the gap, the electrical resistance across the gap is reduced. For best machining results, a high electrical resistance approaching an open circuit is required. Thus, the resistance to flow and the accumulation of of machined particles in the gap should be kept at a minimum.

In finishing operations, the finished hole size in the workpiece is only slightly larger than the tool electrode. Therefore, the resistance to flow in the gap between the electrode and work is high with respect to ideal EDM operations when using a conventional electrode. It has been found that this gap resistance to dielectric flow is a major cause inhibiting the finishing operations in EDM processes. Thus, as the gap resistance to flow is reduced better results can be achieved.

In the past, the flow resistance has been reduced by making the tool electrode just long enough to compensate for electrode wear, for example, a disc when finishing a round hole. This type of electrode is generally known as a wafer electrode. Basically the wafer electrode disintegrates during a machining operation so that little or no usable electrode remains after one hole has been finished. The major disadvantage to this type of electrode is that the gap resistance to flow remains high in the machining zone because the relative size of the tool with respect to the workpiece is constant.

Applicant herein provides a new electrode tool utilizing existing dielectric fluids and dielectric supply sources present on most EDM machines to reduce the gap resistance to flow during and EDM machining process by creating several parallel channels of dielectric flow with the machining gap. The electrode provided herein improves the stability of cut during finishing operations and minimizes the taper caused at the opening of the cut due to dielectric flow therethrough.

SUMMARY OF THE INVENTION

The present invention utilizes a series of cannelures placed on the outer periphery of the electrode to provide increased dielectric flow passages for reducing the gap resistance to flow. This is achieved by supplying dielectric fluid under pressure to the electrode and forcing the dielectric out through cannelures exposed to the machining gap. The workpiece is secured to a table having a low pressure manifold designed to withdraw the dielectric fluid from the machining gap and transfer it to a return system. The dielectric fluid flows out of several cannelures within the electrode and through the gap instead of following a single flow path. The gap resistance to flow is thus reduced because the dielectric fluid flows through the gap in several parallel passages working in combination.

In longer electrodes it is often advantageous to provide alternately spaced supply and return cannelures within the electrode for further reducing the gap resistance to flow by forcing dielectric fluid into the gap at one point on the electrode and withdrawing dielectric fluid from the gap at another point on the electrode. This permits the gap between the electrode and workpiece to be saturated with dielectric coolant without requiring a single pathway for dielectric flow along the entire length of the electrode body.

It is therefore an object of this invention to provide an electrode containing an apparatus permitting increased dielectric flow in the gap between the work and electrode tool in an EDM process.

Another object of the present is to reduce the concentration of machined particles in the dielectric fluid flowing through an opening on the workpiece thus reducing any tapering of the workpiece at the lip of the machined cavity.

Other objects and features of the invention will be readily apparent from the attached drawings and the following description of the preferred embodiment.

THE DRAWINGS

FIG. 1: an embodiment of the invention utilizing a single flow connelure for increasing dielectric flow in the gap.

FIG. 2: a sectional view taken along lines 2—2 of FIG. 1.

FIG. 3: an embodiment of the invention utilizing a series of alternately spaced supply and return flow cannelures for increasing dielectric flow in the gap.

FIG. 4: a section view taken along lines 4—4 of FIG. 3.

FIG. 5: a section view taken along lines 5—5 of FIG. 3.

FIG. 6: an alternative embodiment of the invention utilizing alternately spaced supply and return flow cannelures for increasing the dielectric flow in the gap.

FIG. 7: an end view looking in the direction of the arrow 7 in FIG. 6.

DETAILED DESCRIPTION

Referring first to FIG. 1, there is shown a portion of an electrical discharge machine having the shank 10 of an electrode 12 secured in a tool holder 14. The dielectric fluid supply line 16 supplies dielectric fluid under pressure to the hollow axial channel 18 contained in the body 13 and shank 10 of the electrode 12. A workpiece 20 is secured to a workholder 22 which also functions as a manifold for drawing dielectric from the machining gap 24. Once the dielectric fluid is removed from the gap 24 it is returned to the dielectric supply tank (not shown) via low pressure return line 26. Generally, the workpiece 20 is submerged in dielectric fluid and any fluid flowing out of lip 36 of the workpiece 20 is returned to the supply tank via a separate return line similar to line 26.

In prior art systems, the axial channel 18 extended the entire length of the electrode 10 through end 34. The return line 26 was not necessarily connected to a low pressure manifold to draw dielectric through the end of hole 28 in the workpiece and into the hollow chamber 30 of the manifold 22 as shown in FIG. 1. Generally, the dielectric fluid would flow through channel 18, out end 34, up along wall 32 of the workpiece and out the opening 36 to generate a flow through the gap 24. In a finishing operation this type of electrode and dielectric flow had two disadvantages. First, as the electrode penetrated deeper into the workpiece the dielectric fluid had to flow along the entire length of wall 32. Thus as the electrode progressed into the workpiece 20 the resistance to flow and the probability of improper gap flushing increased. In order to overcome this, the feed rate of the electrode had to be reduced so that the particles being eroded from the workpiece 20 could be flushed out of the gap by dielectric flow. Secondly, the dielectric flow along wall 32 and out of the gap 24 at lip 36 of the workpiece caused a tapering or bell-shaped widening of the lip 36 as the machining process took place.

The present invention solves these problems by providing a pressure biased circumferential cannelure 44 extending around the periphery of the electrode 12. As shown in FIG. 1, the internal axial channel 18 does not extend through end 34 but ends prior to the end 34 of the electrode 12. As best seen in FIG. 2, holes 46 provide fluidic communication between cannelure 44 and the channel 18. This permits flow of the dielectric fluid through pressure supply line 16 into channel 18 and out through holes 46 into cannelure 44. The pressure differential draws a portion of the dielectric fluid downward through hole 28 and into a sub-atmospheric pressure manifold chamber 30. The dielectric is removed via exhaust line 26 to a supply tank (not shown) where it is again recycled under pressure through line 16 and into channel 18. Another portion of the dielectric fluid flowing out of cannelure 44 and into gap 24 flows upward along body 13 of the electrode and out the lip 36 of hole 28. The pressure differential also draws this portion of the dielectric fluid to the supply tank for recycling via pressure supply line 16.

Thus the present invention has two parallel flow paths for the dielectric fluid. The resistance to flow is considerably less than the resistance for the same electrode having dielectric fluid flowing out of the end 34 of the electrode 12 and along body 13 of the electrode to the lip 36 of the hole 28. This reduced resistance to flow allows the electrode to penetrate the workpiece at a faster feed rate without endangering the quality of the finish. Further, since the resistance to flow is reduced, a larger quantity of dielectric fluid flows through the gap per unit of time. Therefore, the fluid has a lower concentration of machined particles resulting in a reduction of taper, or minimizing the bell-shaped mouth, of the finished hole at lip 36.

FIG. 3 illustrates an alternative embodiment of the electrode 12. Instead of a single cannelure 44 supplying dielectric fluid under pressure to the gap there is provided a series of alternately spaced pressure and exhaust cannelures around circumference of the electrode body 13. The hollow longitudinal channel 50 within the body of the electrode 12 is connected to the supply line 16 in a manner similar to that shown in FIG. 1. This channel is displaced from the axis of the electrode 12, as best seen in FIG. 4. There is added a second longitudinal channel 52 extending through end 34 and located on the same diameter as channel 50. The channel 52 is open to an exhaust system through end 34 of the electrode 12.

As shown in FIG. 4, the holes 54 provide a passageway between chamber 50 and peripheral cannelure 58. Thus, dielectric is supplied under pressure to cannelure 58. As can be seen in FIG. 3, the cannelure 60 is connected to channel 50 in a like manner. The return cannelure 62 is connected to return channel 52 via holes 56 as shown in FIG. 5. Thus, dielectric fluid is drawn from the gap through cannelure 62 into holes 56 and into channel 52.

A sleeve 64 slidably fits on the periphery of the electrode body 13. When a plurality of cannelures are used, the sleeve is necessary in order to insure the greatest proportion of the dielectric fluid flows through the machining gap and not out of the unbiased cannelure.

If the cannelure 60 has progressed below the surface 66 of the workpiece 20, and the sleeve 64 were not present, the dielectric would take the path of least flow resistance and flow out of cannelure 58 instead of cannelure 60 and into the gap 24. By providing sleeve 64, the dielectric is forced out of the cannelures exposed to the machining gap 24. As the electrode 12 progresses further into the workpiece 20, the cannelure 62 is exposed to the gap 24. As herein described cannelure 62 is connected to a low pressure channel 52. Thus, two parallel dielectric flow paths are exposed to the gap. The first path is out of cannelure 60, through the machining gap 24 and into the hole 28 of the workpiece. The second flow path is out of cannelure 60 through the gap 24 into cannelure 62 through holes 56, and into sub-atmospheric pressure channel 52 where the fluid is again released into cavity 28.

It can be seen as the electrode 12 further progresses into the workpiece 20, the cannelure 58 will be exposed to machine gap 36. When this occurs, two more paths are created. The dielectric first flows out of cannelure 58 and into cannelure 62 as herein described. Further, dielectric flows out of cannelure 58 through the gap 24 and out the lip 36 of the workpiece 20.

Thus the electrode configuration as illustrated in FIG. 3 provides four parallel flow paths for dielectric fluid during the machining process. This further reduces the resistance to flow and permits faster feed rates and more reliable machining conditions. It can be seen that any number of cannelures and any combination of supply and return biasing can be utilized to reduce the flow resistance.

Illustrated in FIG. 6 is a second alternative embodiment of the invention. The dielectric supply channel 68 extends through the end 34 of electrode 12. An insert 70 creates a plug fit between land 72 of the insert and the walls of the chamber 68 when placed in the end 74 of pressure chamber 68 in the manner illustrated to isolate the pressure and exhaust cannelures. The hollow chamber 76 is open to chamber 68 to provide a supply inlet. Holes 82 in conjunction with holes 86 connect cannelure 80 with the pressure supply line. Holes 46 are connected to cannelure 78 in the manner previously described. The outer passage 84 which exists between chamber 68 and insert 70 is connected to an exhaust line via a manifold in the same manner as herein described. Holes 86 connect this passage to cannelure 88 thus sub-atmospheric pressure biased cannelure 88. Flow cannelures 78 and 80 are high pressure biased. A sleeve 64 is provided for the same purpose as described with respect to the embodiment of FIG. 3. Thus the system illustrated in FIGS. 6 and 7 is essentially the same system created by the embodiment of FIG. 3.

It should be understood that the foregoing is for illustrative purposes only and is not intended to limit the spirit of the invention or the scope of the appended claims.

What is claimed is:

1. An improvement for use with an electrical discharge machine having a dielectric fluid supply system for introducing dielectric fluid under pressure to a gap between a plug-shaped body of an electrode, said body having an axially displaceable machining end-face, and a workpiece, the improvement comprising:
   a. a high pressure biased circumferential cannelure in the electrode body, said cannelure being in fluidic communication with the fluid supply whereby fluid is introduced to the gap; and
   b. a sub-atmospheric pressure system for withdrawing the fluid from the gap.

2. The apparatus of claim 1 further comprising a sub-atmospheric pressure biased circumferential cannelure in the electrode body, said cannelure being in fluidic communication with said sub-atmospheric pressure system for withdrawing fluid from the gap.

3. The apparatus of claim 2 wherein there is further provided a sleeve designed to slidably fit over the body of said electrode for preventing escape of fluid from said high pressure cannelure when it is not exposed to the workpiece.

4. The apparatus of claim 2 further comprising:
   a. a first longitudinal channel within the body of the electrode suited to provide fluidic communication between the high pressure cannelure and the supply system; and
   b. a second longitudinal channel within the body of the electrode suited to provide fluidic communication between the sub-atmospheric pressure cannelure and the sub-atmospheric pressure system.

5. The apparatus of claim 2 further comprising:
   a. a longitudinal channel within the body of the electrode for providing fluidic communication between said high pressure cannelure and the supply system, the end of said channel extending through the end of the body of said electrode; and
   b. an insert forming a plug-fit with said channel when placed in the end of said channel for isolating the end of said channel from said high pressure cannelure and for providing fluidic communication between the sub-atmospheric pressure cannelure and the sub-atmospheric pressure system.

6. An improvement for use with an electrical discharge machine having a dielectric fluid supply system for introducing dielectric fluid under pressure to a gap between a plug-shaped body of an electrode, said body having an axially displaceable machining end-face, and a workpiece, the improvement comprising:
   a. a longitudinal channel within the electrode suited to accept dielectric fluid from said supply system;
   b. diametric channels within the body of the electrode and in fluidic communication with the longitudinal channel;
   c. a circumferential cannelure in the electrode body and in fluid communication with said diametric channels for providing dielectric flow in the gap when the electrode penetrates the work; and
   d. a sub-atmospheric pressure manifold suited to withdraw the dielectric fluid from the gap.

7. An improvement for use with an electrical discharge machine having a dielectric fluid supply system for introducing dielectric fluid under pressure to a gap between a plug-shaped body of an electrode, said body having an axially displaceable machining end-face, and a workpiece the improvement comprising:
   a. spaced high pressure biased circumferential cannelures in the electrode body, said cannelures being in fluidic communication with the fluid supply whereby fluid is introduced to the gap;
   b. a sub-atmospheric pressure system for withdrawing the fluid from the gap; and
   c. sub-atmospheric pressure biased circumferential cannelures in the electrode body said cannelures being in fluidic communication with the sub-atmospheric pressure system and interposed between two high pressure cannelures.

8. The apparatus of claim 7 further comprising:
   a. a first longitudinal channel within the body of the electrode suited to provide fluidic communication between the high pressure cannelures and the supply system; and
   b. a second longitudinal channel within the body of the electrode suited to provide fluidic communication between the sub-atmospheric pressure cannelures and the sub-atmospheric pressure system.

9. The apparatus of claim 7 further comprising:
   a. a longitudinal channel within the body of the electrode for providing fluidic communication between said high pressure cannelures and the supply system, the end of said channel extending through the end of the body of said electrode; and
   b. an insert forming a plug-fit with said channel when placed in the end of said channel for isolating the end of said channel from said high pressure cannelures and for providing fluidic communication between the low pressure cannelures and the sub-atmospheric pressure system.

* * * * *